(12) United States Patent
Quillian, III

(10) Patent No.: US 6,216,876 B1
(45) Date of Patent: Apr. 17, 2001

(54) VACUUM ASSISTED NUT COLLECTION DEVICE

(76) Inventor: Henry M. Quillian, III, 3826 N. Stratford Rd., NE., Atlanta, GA (US) 30342

( * ) Notice: Subject to any disclaimer, the term of this patent is extended or adjusted under 35 U.S.C. 154(b) by 0 days.

(21) Appl. No.: 09/137,020

(22) Filed: Aug. 20, 1998

(51) Int. Cl.[7] ............................... B07B 4/00; B65G 53/04
(52) U.S. Cl. .................. 209/138; 209/143; 15/300.1; 15/354; 406/38; 406/151
(58) Field of Search ........................ 406/38, 151, 154, 406/157, 163, 164, 15, 138, 139.1, 142; 15/300.1, 354, 358, 362; 209/143; B65G 53/24

(56) References Cited

U.S. PATENT DOCUMENTS

| | | | |
|---|---|---|---|
| 993,180 | * | 5/1911 | Leaphart ........................... 406/151 |
| 1,047,164 | * | 12/1912 | Butenschoen ....................... 406/38 |
| 2,767,031 | * | 10/1956 | Huffman ........................... 406/163 |
| 2,813,757 | * | 11/1957 | Shirk ............................. 406/163 |
| 4,086,706 | * | 5/1978 | Lesk et al. ........................ 34/33 |
| 4,793,743 | * | 12/1988 | Grodecki et al. ................... 406/123 |
| 5,174,689 | * | 12/1992 | Kondolf ........................... 406/112 |

FOREIGN PATENT DOCUMENTS

| | | | |
|---|---|---|---|
| 84298 | * | 9/1954 | (NO) ............................. 406/151 |
| 48102 | * | 2/1981 | (RU) ............................. 406/157 |

\* cited by examiner

*Primary Examiner*—Christopher P. Ellis
*Assistant Examiner*—Joe Dillon, Sr.
(74) *Attorney, Agent, or Firm*—Henry M. Quillian, III

(57) ABSTRACT

The invention is an adjustable portable vacuum assisted device for collecting dense matter, such as nuts, while separating and ingesting less dense matter in the same original environment as the nuts, such as leaves or other lawn refuse. The source of vacuum may be the inlet side of a lawn blower. In the invention, ambient forces, such as gravity and turbulence disengage dense solids in a gaseous stream from less dense matter in the gaseous stream induced by the vacuum means without operational malfunction caused by clogging or jamming of the device. Disengaged dense matter is collected within a collection chamber while less dense matter is ingested through and discharged by the vacuum means.

7 Claims, 1 Drawing Sheet

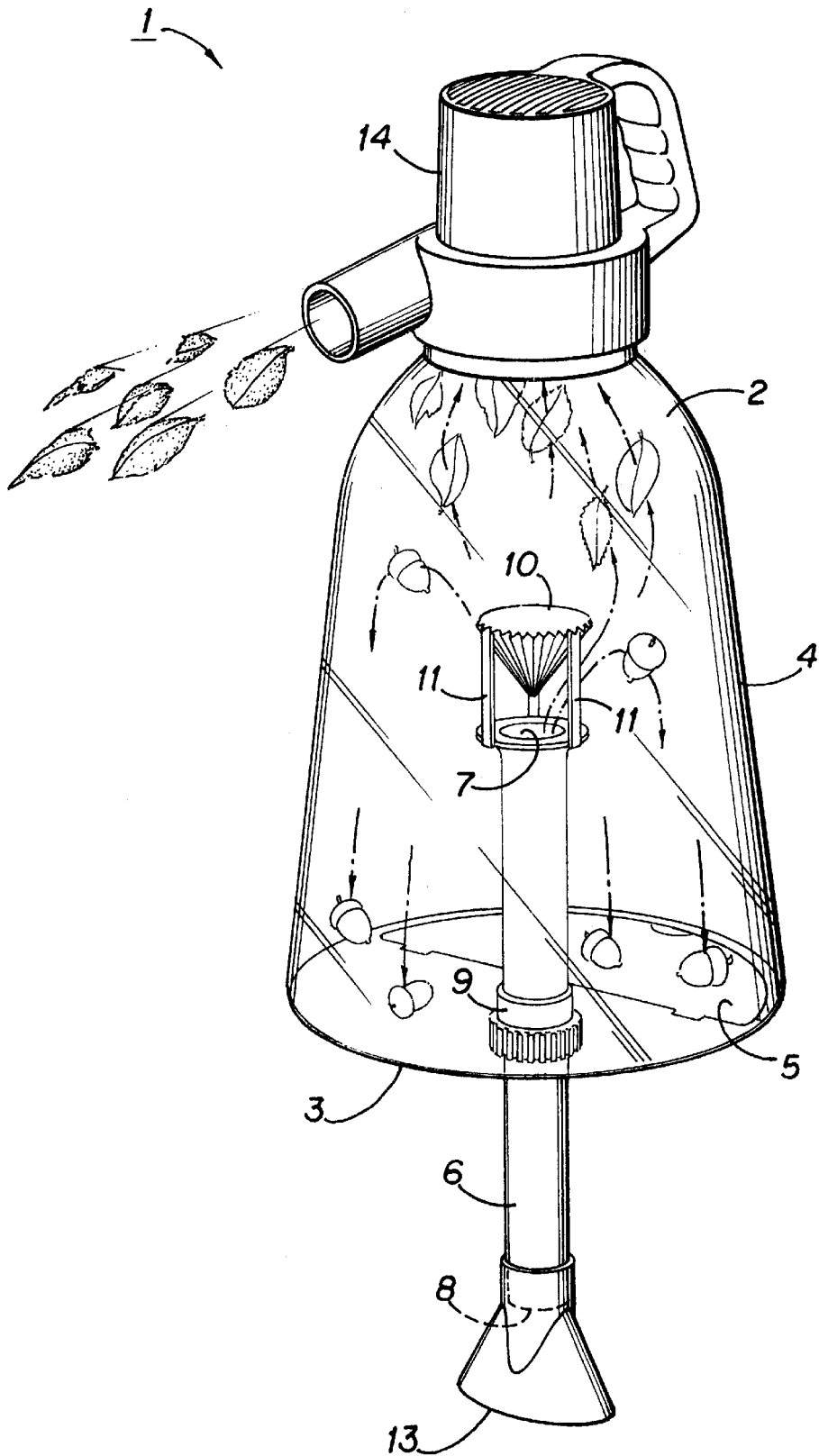
FIG

VACUUM ASSISTED NUT COLLECTION DEVICE

FIELD OF THE INVENTION

The present invention concerns lawn tools, and provides a lawn suction device to capture and remove nuts.

BACKGROUND OF THE INVENTION

Nuts dropped from nut bearing trees-during the fall season are a tremendous problem for homeowners, especially on freshly planted lawns. Nuts resist conventional removal techniques such as raking and blowing, and sprout during the spring in lawns. What is needed is a device capable of removing nuts from home lawns without destroying the lawn or clogging too frequently.

SUMMARY OF THE INVENTION

In one aspect the invention provides a vacuum assisted nut collection device comprising suction means, a substantially enclosed outer casing secured to the suction means and comprising a receiving pan, and a suction tube penetrating the outer casing and comprising a first opening within the outer casing and a second opening outside the outer casing, wherein the outer casing is sufficiently enclosed to sustain a vacuum capable of drawing nuts through the suction tube into the outer casing.

DESCRIPTION OF THE FIGURE

FIG. 1 shows a cutout perspective view of a vacuum assisted nut collection device of the present invention.

DESCRIPTION

In one aspect the invention provides a vacuum assisted nut collection device comprising suction means, an outer casing forming an enclosure secured to the suction means and comprising a receiving pan, and a suction tube penetrating the outer casing and comprising a first opening within the outer casing and a second opening outside the outer casing, wherein the outer casing is sufficiently enclosed to sustain a vacuum capable of drawing nuts through the suction tube into the outer casing.

Referring to FIG. 1 there is shown a partial view of a vacuum assisted collection device 1. Device 1 comprises an outer casing 2 having an outer circumferential wall 4 and a receiving pan 3. The outer casing can be any shape suitable for collecting nuts, and is conical in FIG. 1. The receiving pan 3 may optionally contain a hinged or clipped door 5 for emptying nuts from the device. Suction means 14 is secured to the outer casing to the collection device by any suitable securing means, including latches, complementary threading between the suction means and outer casing, and the like. Preferred suction means include lawn blowers that are used by homeowners to blow their lawns, and which can be used in reverse to collect leaves, by affixing a suitable vacuum device to the air inlet of the blower. These devices are herein after called reversible lawn blowers.

A suction tube 6 penetrates the outer casing preferably through the receiving pan. The suction tube comprises upper and lower openings 7 and 8 respectively. When suction means is activated a vacuum is created within the outer casing which draws air through suction tube 6 into outer casing 2. An intake manifold 13 to optimally distribute and/or concentrate the vacuum supplied through the collection device is optionally secured to the suction tube 6 at lower opening 8.

A deflector 10 optionally is positioned between the upper opening 7 and the suction means, to prevent nuts and other dense debris from passing from the suction tube into the suction means. In the embodiment shown in FIG. 1 deflector 10 is optionally serrated and suspended by rods 11, attached to suction tube 6 by appropriate securing means. Deflector 10 is positioned in the path of air and debris that flows from the suction tube during operation of the device, and is axially aligned with suction tube 6. Deflector 10 is preferably secured by appropriate means within the outer casing 2, but also to allow less dense matter suitable for ingestion in the suction means to pass out of outer casing 2.

Suction tube 6 is optionally mounted within a sleeve 9 affixed to outer casing 2 to allow a sliding adjustment of suction tube 6 to compensate for the possible elimination of the deflector 10 and to allow for adjustment of the overall length of the device.

Sleeve 9 would allow the upper opening of suction tube 6 to be placed at sufficient distance from the suction means as to allow gravity, combined with absence of directed air flow outside suction tube 6, but inside outer casing 2, to dissipate the momentum of dense matter toward the suction means so that it drops into the interior of outer casing 2 without contacting a deflector. Sleeve 9 optionally may allow adjustment of the suction tube 6 so as to make operation of the device more comfortable for the operator.

Although the present process has been described with reference to specific details of certain embodiments thereof, it is not intended that such details should be regarded as limitations upon the scope of the invention except as and to the extent that they are included in the accompanying claims.

What is claimed is:

1. A portable vacuum assisted nut collection device adapted to be man-portable for collecting nuts and separating said nuts from debris comprising:
   a. a suction means;
   b. an outer casing forming an enclosure secured to the suction means and housing a receiving pan; and
   c. a suction tube penetrating the outer casing and comprising a first opening within the outer casing and a second opening outside the outer casing;

wherein the outer casing is sufficiently enclosed to sustain a vacuum capable of drawing nuts and debris through the suction tube into the outer casing; and wherein the first opening of the suction tube is positioned relative to the suction means such that the vacuum is of a magnitude insufficient to draw the nuts into the suction means while the debris passes through the suction means.

2. The vacuum assisted nut collection device of claim 1 further comprising a door in the outer casing for emptying the contents of the outer casing.

3. The vacuum assisted nut collection device of claim 1 further comprising an intake manifold secured to the second opening of the suction tube.

4. The vacuum assisted nut collection device of claim 1 further comprising a deflector disposed between the first opening of the suction tube and the suction means.

5. The vacuum assisted nut collection device of claim 1 further comprising a serrated deflector disposed between the first opening of the suction tube and the suction means.

6. The vacuum assisted collection device of claim 1 wherein the suction means is a reversible lawn blower.

7. The vacuum assisted collection device of claim 1 wherein the suction tube is movably attached to the outer casing.

* * * * *